H. HANSTEIN.
DOWEL PIN.
APPLICATION FILED MAY 12, 1913.
1,082,120.
Patented Dec. 23, 1913.
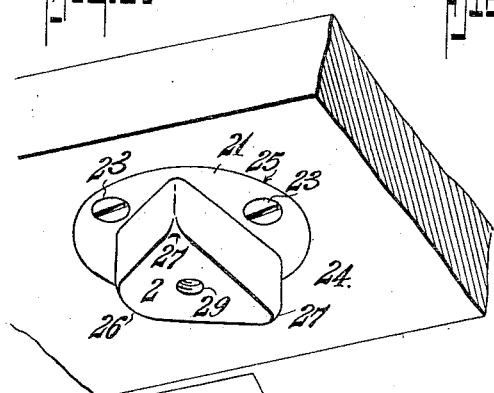
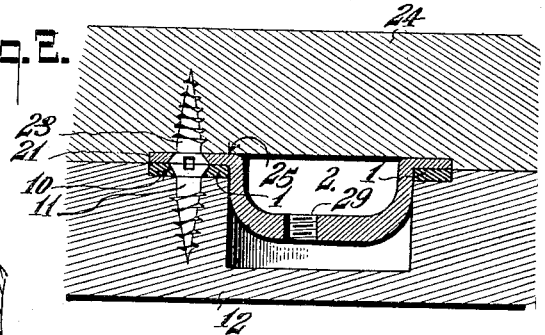
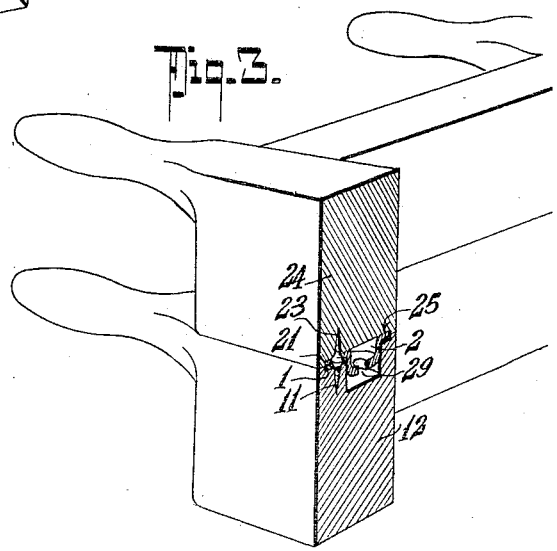
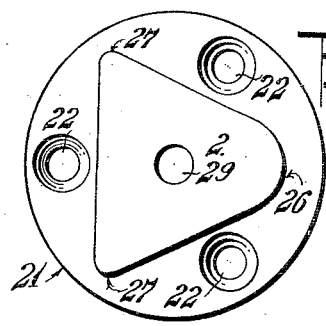
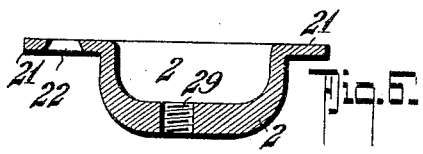
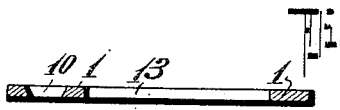
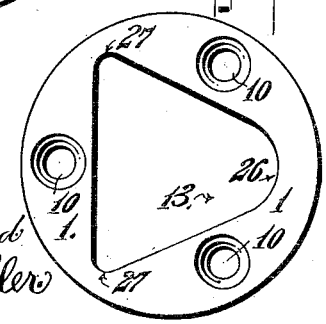
WITNESSES:
H. Woodard
Charles J. Diller
INVENTOR
Henry Hanstein,
BY
Fred G. Dieterich & Co.
ATTORNEYS

UNITED STATES PATENT OFFICE.

HENRY HANSTEIN, OF POUGHKEEPSIE, NEW YORK.

DOWEL-PIN.

1,082,120.   Specification of Letters Patent.   Patented Dec. 23, 1913.

Application filed May 12, 1913. Serial No. 767,073.

*To all whom it may concern:*

Be it known that I, HENRY HANSTEIN, residing at Poughkeepsie, in the county of Dutchess and State of New York, have invented a new and Improved Dowel-Pin, of which the following is a specification.

My invention is in the nature of an improved dowel pin capable of being used for any of the purposes for which an ordinary dowel pin is adapted, but more especially designed for use on wood or metal patterns, core boxes, flasks and other articles requiring sections and which need be frequently put together and taken apart.

Primarily my invention has for its object to provide a simple device of the character stated, which can be manufactured at a small cost, is practically indestructible and is effective for its intended purposes.

Another object of my invention is the providing of a dowel pin, which in its practical application will take the place of two ordinary dowels, since shifting of the two parts doweled together is rendered impossible by reason of the construction of my dowel.

Another object of my invention is to provide a dowel whose parts are coöperatively so arranged and combined that it is impossible to make a mistake in assembling the two sections of the pattern, and by the use of which many annoyances and mistakes in assembling pattern sections is avoided.

A further object of my invention is to provide an improved construction of dowel pin having a bearing and guiding surface much larger than appears in the ordinary forms of dowel pin and of such shape that renders the dowel pin much more durable and safer to use.

With other objects in view that will hereinafter appear, my invention is an improved dowel pin that embodies the peculiar construction and novel arrangement of parts hereinafter described in detail, pointed out in the claims and illustrated in the accompanying drawings, in which:

Figure 1 is a perspective view of the two parts that constitute my improved dowel pin. Fig. 2 is a vertical section showing my dowel applied to two sections of a pattern or other separable body. Fig. 3 is a perspective view, parts being in section, of a portion of two sections of a flask or pattern joined by my dowel pin. Fig. 4 is an inverted plan view of the upper dowel or lifting member. Fig. 5 is a plan view of the lower dowel or topping member. Figs. 6 and 7 are cross sections of the said members.

My improved dowel which can be made of any desired size and thickness may be cast of any suitable metal or stamped out of sheet metal.

In carrying out my invention the lower member 1 is in the nature of a flat disk having a plurality of countersunk apertures 10 for the reception of the fastening screws 11 that secure it to its respective section 12, the latter having a suitable bore or recess to receive the said member 1. The member 1 has a centrally disposed arbitrarily shaped opening 13, the shape of which is of such character that the pin 2, which is of a like shape can be entered into the said opening only under one particular adjustment.

2 designates the pin member which includes a circular flange 21 of a diameter equal that of the disk 1, and the said flange is also provided with countersunk openings 22 for the screws 23 that secure the pin portion to its respective pattern section 24, the latter having a shallow bore 25 for the flange 21. The pattern section 12 has a deep bore or socket for receiving the pin 2 as is clearly shown in Fig 2.

The particular shape of the pin and the opening to receive it may be of any arbitrary shape so long as the configurations thereof are such that the pin can match the opening under one particular adjustment. I prefer to make the pin and the opening of triangular shape with the angle edges rounded, two of such edges 27—27 being of like shape and the third 26 of a different shape, preferably larger, as shown, the pin being of corresponding shape, as shown.

By reason of forming two members as shown and described, it is obvious that it is impossible to make a mistake in assembling the two sections of the pattern together as the dowel pin will fit one way only on account of the corresponding shapes of the dowel pin and the opening it engages. Furthermore, by reason of forming the dowel and pin parts as stated, a large bearing and guiding surface is provided.

In the most complete form of my dowel and pin the pin portion is made sufficiently thick at the penetrating end to provide for an internally threaded aperture 29 for receiving a lifter and since my dowel pin can be readily placed in the center of any parted pattern, it is of great advantage to use the same as a rapping and lifting plate.

From the foregoing taken in connection with the drawing, the manner in which my invention is used and its advantages will be readily apparent to those skilled in the art to which it appertains.

What I claim is:

A device of the character described, comprising a plate adapted to be secured to a section of a pattern or other like body, said plate having a triangular opening, the corners of said opening being rounded and one of said corners being rounded on an arc of greater curvature than that of the other corners, another plate adapted to be secured to an opposing section of the pattern or other object, and having a projecting portion shaped to fit the opening in said first mentioned plate, substantially as shown and for the purposes described.

HENRY HANSTEIN.

Witnesses:
CHAS. E. SWANSTROM,
FRED WEBER.

Copies of this patent may be obtained for five cents each, by addressing the "Commissioner of Patents, Washington, D. C."